(12) United States Patent
Hassan et al.

(10) Patent No.: US 11,146,360 B2
(45) Date of Patent: Oct. 12, 2021

(54) DATA TRANSMISSION USING PUNCTURING AND CODE SEQUENCES

(71) Applicant: Microsoft Technology Licensing, LLC, Redmond, WA (US)

(72) Inventors: Amer Aref Hassan, Kirkland, WA (US); Gareth L. E. Bridges, Redmond, WA (US); Whitney J Giaimo, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 16/514,795

(22) Filed: Jul. 17, 2019

(65) Prior Publication Data

US 2021/0021373 A1 Jan. 21, 2021

(51) Int. Cl.
*H04L 1/00* (2006.01)
*H04W 56/00* (2009.01)
(Continued)

(52) U.S. Cl.
CPC ........ *H04L 1/0069* (2013.01); *H04J 13/0025* (2013.01); *H04J 13/0029* (2013.01); *H04W 56/001* (2013.01)

(58) Field of Classification Search
None
See application file for complete search history.

(56) References Cited

U.S. PATENT DOCUMENTS

| 5,317,690 | A | | 5/1994 | Krzycki et al. |
| 5,790,602 | A | * | 8/1998 | Stephens ............ H03J 7/02 375/326 |

(Continued)

FOREIGN PATENT DOCUMENTS

| EP | 1050986 A2 | 11/2000 |
| WO | 0223775 A2 | 3/2002 |

OTHER PUBLICATIONS

Hawkes, et al., "Construction and Performance of a PCM Frame Synchronizer with Self-Varying Threshold", In Proceedings of the IEEE Transactions on Communication Technology, vol. 16, Issue 1, Feb. 1, 1968, pp. 142-148.

(Continued)

*Primary Examiner* — Scott M Sciacca
(74) *Attorney, Agent, or Firm* — Schwegman Lundberg & Woessner, P.A.

(57) ABSTRACT

Disclosed are systems, methods, and non-transitory computer-readable media for improved data transmissions using puncturing and binary sequences. A receiving device receives a sequenced data input that includes a set of individual values and performs a puncturing of the sequenced data input, yielding a punctured sequenced data input. The receiving device calculates correlation values for the punctured sequence data input and a set of predetermined data outputs. The receiving device determines whether any of the resulting correlation values exceeds a threshold correlation value. In response to determining that the correlation value calculated based on one of the predetermined data outputs exceeds the threshold correlation value, the receiving device determines that the sequenced data input corresponds to the predetermined data output.

20 Claims, 7 Drawing Sheets

(51) Int. Cl.
*H04J 13/10* (2011.01)
*H04J 13/00* (2011.01)

(56) References Cited

U.S. PATENT DOCUMENTS

| | | | |
|---|---|---|---|
| 2002/0013926 A1* | 1/2002 | Kim | H04L 1/0069 |
| | | | 714/781 |
| 2009/0180464 A1* | 7/2009 | Walley | H04L 7/042 |
| | | | 370/350 |
| 2012/0317464 A1 | 12/2012 | Yoshiyama | |
| 2018/0159679 A1 | 6/2018 | De Ruijter et al. | |
| 2019/0045470 A1* | 2/2019 | Chervyakov | H04W 56/0015 |
| 2019/0103955 A1 | 4/2019 | Lee et al. | |
| 2020/0014483 A1* | 1/2020 | Lee | H04L 27/2613 |
| 2020/0196254 A1* | 6/2020 | Kerhuel | H04L 5/0023 |
| 2021/0021372 A1 | 1/2021 | Hassan et al. | |

OTHER PUBLICATIONS

"International Search Report and Written Opinion Issued in PCT Application No. PCT/US20/033671", dated Aug. 14, 2020, 12 Pages.

U.S. Appl. No. 16/514,778, filed Jul. 17, 2019, Data Transmission Using Puncturing and Error Correction Encoding.

"U.S. Appl. No. 16/514,778, Non Final Office Action dated Aug. 19, 2020", 25 pgs.

"U.S. Appl. No. 16/514,778, Final Office Action dated Nov. 30, 2020", 25 pgs.

"U.S. Appl. No. 16/514,778, Non Final Office Action dated Apr. 16, 2021", 23 pgs.

* cited by examiner

DATA TRANSMISSION USING PUNCTURING AND CODE SEQUENCES

TECHNICAL FIELD

An embodiment of the present subject matter relates generally to data transmissions and, more specifically, to improved data transmissions using puncturing and error correction encoding.

BACKGROUND

Many communication channels are subject to channel noise, which causes errors to occur when transmitting digital data between devices. An error may cause the data received by a receiving device to be different than the data that was transmitted by the transmitting device. Current systems either skip this input or request that the data be retransmitted. These solutions are not optimal as they result in lower quality output or increased latency. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
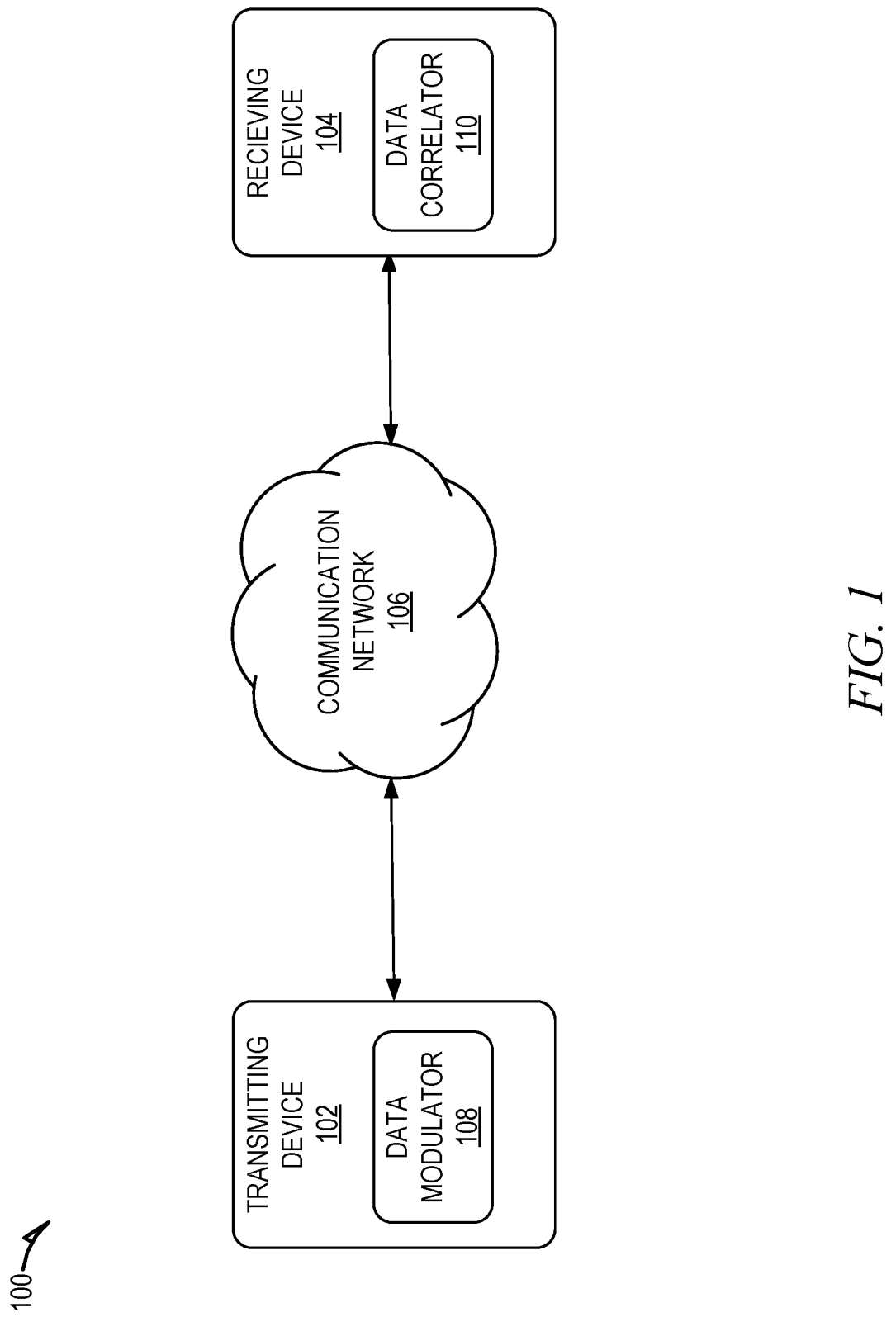
FIG. 1 is a block diagram illustrating an example system for improved data transmissions using puncturing and code sequences, in accordance with some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for improved data transmissions using puncturing and code sequences. Code sequences, such as maximum length sequences (m-sequences) and gold code sequences (gold codes), are used in wireless communications to identify the transmitting device (e.g., the device that transmitted the data). Each transmitting device is assigned a unique code sequence (e.g., gold code, m-sequence), which the transmitting device uses to modulate a data input prior to transmission to a receiving device. Modulating a data input using a code sequence results in a sequenced data input. The use of code sequences to modulate a data input is beneficial because a receiving device can determine the code sequence used to modulate the data input with high probability. For example, the cross correlation of a sequenced data input with the code sequence used to generate the sequenced data input results in a relatively high correlation value. In contrast, the cross correlation of a sequenced data input with a code sequence that was not used to generate the sequenced data input results in a relatively low correlation value.

A receiving device can therefore determine which transmitting device transmitted a sequenced data input by determining which code sequence was used to generate the sequenced data input. For example, the receiving device maintains a code table that lists each unique code sequence and the transmitting device corresponding to the unique code sequence. The receiving device calculates a set of correlation values for a received sequenced data input by cross correlating the sequenced data input with each of the code sequences listed in the code table. The receiving device compares each correlation value from the set of correlation values with a threshold correlation value. The correlation value calculated by cross correlating the sequenced data input with the code sequence that was used to generate the sequenced data input will exceeds the threshold correlation value. Alternatively, the correlation values calculated by cross correlating the sequenced data input with the code sequences that were not used to generate the sequenced data input will be less that the threshold correlation value. Once the correct code sequence is identified (e.g., the correlation value calculated using the code sequence meets or exceeds the threshold correlation value), the receiving device uses the code table to identify the transmitting device that corresponds to the code sequence (e.g., the transmitting device that uses the code sequence to generate sequenced data input) The receiving device determines that the transmitting device corresponding to the code sequence device transmitted the sequenced data input.

A data input is an ordered set of individual values, such as a binary number made up of an ordered set of zeroes and ones (e.g., 0001, 0010, etc.). The transmitting device uses the unique code sequence (e.g., gold code) assigned to the transmitting device to modulate the data input into a sequenced data input. The resulting sequenced data input is an ordered set of individual values that includes more individual values than the original data input. For example, the original data input may include four individual values (e.g., 0001) and the sequenced data input may include sixteen individual values (e.g., 0001 0001 0001 0001).

The transmitting device transmits the sequenced data input to the receiving device, either once or multiple times to provide redundancy for error correction. The receiving device calculates a set of correlation values for the received sequenced data input by cross correlating the sequenced data input with each code sequence included in its maintained code table. Each code sequence is an ordered set of individual values that includes the same number of individual values as the sequenced data input transmitted by the transmitting device. Cross correlation is an algorithm for calculating the correlation value based on a sequenced data input and a code sequence. To cross correlate a sequenced data input and a code sequence, in some embodiments, the receiving device multiplies the corresponding individual values from the sequenced data input and the code sequence and determines the sum of the resulting values. For example, to determine the correlation value between the sequenced data input 1001 and the code sequence 1101, the receiving device multiplies the first value from sequenced data input with the first value from code sequence (1*1=1), multiplies the second value from sequenced data input with the second value from code sequence (0*1=0), multiplies the third value from sequenced data input with the third value from code sequence (0*0=0), and multiplies the fourth value from sequenced data input with the fourth value from code sequence (1*1=1). The receiving device assigns the value of negative one to each resulting 0 and then determines the sum of resulting values (e.g., 1+(−1)+(−1)+1=0).

The receiving device performs this process of cross correlating the sequenced data input with each code sequence maintained in the code table, resulting in the set of correlation values. The receiving device then compares each correlation value to the threshold correlation value to identify the code sequence used to generate the sequenced data input. The receiving device can then identify the transmitting device that transmitted the sequenced data input based on the identified code sequence. For example, the transmitting device uses the code table to identify the transmitting device that corresponds to the code sequence determined to have been used to generate the sequenced data input.

In some cases, an error that occurs during transmission of the sequenced data input may result in one or more individual values being added to the sequenced data input. As a result, the number of individual values received by the receiving device may be greater than the number of individual values transmitted by the transmitting device. This causes an issue because data sequences of different lengths cannot be cross correlated. Rather than requesting that the sequenced data input be retransmitted by the transmitting device, the receiving device punctures the sequenced data input to reduce the number of individual values included in the sequenced data input. Puncturing the sequenced data input includes removing one or more of the individual values included in the sequenced data input. For example, a sequenced data input that includes seventeen individual values may be punctured to remove one of the individual values, resulting in a sequenced encoded data input that includes sixteen individual values.

The receiving device attempts to determine the transmitting device that transmitted the sequenced data input based on the resulting punctured sequenced data input. For example, the receiving device calculates a set of correlation values based on the punctured sequenced data input and compares the set of correlation values to the threshold correlation value. If one of the correlation values meets or exceeds the threshold value, the receiving device determines that the code sequence used to calculate the correlation value was used to generate the sequenced data input. The receiving device then determines the transmitting device that transmitted the sequenced data input based on the identified code sequence.

In some instance, each of the correlation values calculated based on a punctured sequenced data input may be less than the threshold correlation value (e.g., none of the correlation values meets or exceeds the threshold correlation value). Accordingly, the receiving device may repeat this process and generate additional punctured sequenced data inputs by removing different individual values from the sequenced data input. The receiving device may calculate a set of correlation values based on each punctured sequenced data input and compare the correlation values to the threshold correlation value. This process may be repeated until the code sequence used to generate the sequenced data input is identified (e.g., a correlation value exceeds the threshold correlation value) or until a threshold period of time has elapsed (e.g., a timeout occurs).

The process of puncturing the sequenced data input and attempting to identify a corresponding data output (e.g., the puncturing process) may be performed sequentially or in parallel. For example, the receiving device may perform the puncturing process sequentially such that the puncturing process is repeated in response to determining that the transmitting device could not be determined based on a previously punctured sequenced data input. Alternatively, the puncturing process may be performed concurrently such that the receiving device generates multiple punctured sequenced data inputs from a sequenced data input and/or attempts to identify the transmitting device using multiple punctured sequenced data inputs at least partially at the same time.

In some instances, using a punctured sequenced data input to identify the transmitting computing device may not be reliable. That is, use of the punctured sequenced data input may result in a correlation value that exceeds the threshold correlation value, however the result may not be accurate. As explained earlier, use of code sequences to modulate data input allows a receiving device to determine the code sequence used to modulate the data input with high probability. For example, correlating the modulated data input with the correct code sequence results in a relatively high correlation value, whereas correlating the modulated data input with an incorrect code sequence results in a relatively low correlation value. Accordingly, the receiving device may perform checks to ensure that these expected results are met to ensure that the results are reliable. For example, the receiving device may ensure that only one of the threshold values calculated based on the punctured sequenced data input exceed the threshold correlation value. Further, the receiving device may ensure that, although only one correlation value exceeds the threshold correlation value, all of the other correlation values are relatively low, as expected. That is, the receiving device may compare each of the other correlation values to a lower threshold value to ensure that each of the other correlation values is not within an unacceptable range of the threshold correlation value.

The receiving device determines that the results are unreliable if more than one correlation values exceeds either of the threshold values. For example, the receiving device determines that the results are unreliable if more than one of the correlation values exceeds the higher threshold value indicating that the code sequence was used to generate the sequenced data input, of exceeds the loser threshold indicating that a correlation value for an incorrect code sequence is not relatively low as expected. In this type of instance, the receiving device may ignore the results of the particular puncturing process and continue attempting to determine the identity of the transmitting device using other punctured sequenced data inputs.

FIG. 1 is a block diagram illustrating an example system 100 for improved data transmissions using puncturing and code sequences, in accordance with some example embodiments. As shown, the system 100 includes a transmitting device 102 and a receiving device 104 connected to a communication network 106 and configured to communicate with each other through use of the communication network 106. The communication network 106 is any type of network, including a local area network (LAN), such as an intranet, a wide area network (WAN), such as the internet, or any combination thereof. Further, the communication network 106 may be a public network, a private network, or a combination thereof. The communication network 106 is implemented using any number of communication links associated with one or more service providers, including one or more wired communication links, one or more wireless communication links, or any combination thereof. Additionally, the communication network 106 is configured to support the transmission of data formatted using any number of protocols.

Multiple computing devices can be connected to the communication network 106. A computing device is any type of general computing device capable of network communication with other computing devices. For example, a computing device can be a personal computing device such as a desktop or workstation, a business server, or a portable computing device, such as a laptop, smart phone, or a tablet personal computer (PC), or an Internet of Things (Iot) device, such as a sensor, wearable, smart meter, etc. A computing device can include some or all of the features, components, and peripherals of the machine 700 shown in FIG. 7.

To facilitate communication with other computing devices, a computing device may include a communication interface configured to receive a communication, such as a request, data, and the like, from another computing device in network communication with the computing device and pass the communication along to an appropriate module running on the computing device. The communication interface also sends a communication to another computing device in network communication with the computing device.

The transmitting device 102 transmits digital data to the receiving device 104 via the communication network 106. For example, the transmitting device 102 may be an IoT device, such as a smart meter, that transmits data to the receiving device 104, which is an access point or controller. Although the transmitting device 102 and the receiving device 104 are shown as two separate types of entities, this is just for ease of explanation and not meant to be limiting. In some embodiments, the transmitting device 102 may also be a receiving device that receives data from other transmitting devices. Likewise, the receiving device 104 may be a transmitting device 102 that transmits data to other receiving devices. Although the shown system 100 includes only one transmitting device 102 and one receiving device 104, this is also not meant to be limiting. One skilled in the art would appreciate that the system 100 can include any number of transmitting devices 102 and receiving devices 104. Accordingly, both the transmitting device 102 and the receiving device 104 may concurrently accept connections from and interact with any number of other transmitting and receiving devices. Hence, the transmitting device 102 and receiving device 104 may be of varying type, capabilities, operating systems, and so forth.

As shown, the transmitting device 102 includes a data modulator 108 and the receiving device 104 includes a data correlator 110. The data modulator 108 is a device or program implemented on the transmitting device 102 that converts data from its original format into another format using a unique code sequence (e.g., gold code, m-sequence) assigned to the transmitting device 102. For example, the data modulator 108 uses the code sequence to modulate a data input, thereby converting the data input into a sequenced data input prior to transmission from the transmitting device 102 to the receiving device 104.

The data correlator 110 is a device or program implemented on the receiving device 104 that determines the code sequence used to generate a received sequenced data input, which can be used to identify the transmitting device 102 that transmitted the sequenced data input to the receiving device. This can be useful when synchronizing data received from multiple transmitting device, such as in Internet of Things (IoT) applications.

The use of code sequences to modulate a data input is beneficial because the data correlator 110 of the receiving device 104 can determine the code sequence used to modulate the data input with high probability. For example, the cross correlation of the sequenced data input with the code sequence used to generate the sequenced data input results in a relatively high correlation value. In contrast, the cross correlation of a sequenced data input with a code sequence that was not used to generate the sequenced data input results in a relatively low correlation value.

The data correlator 110 can therefore identify the transmitting device 102 that transmitted the sequenced data input by determining which code sequence was used to generate the sequenced data input. To accomplish this, the data correlator 110 maintains a code table that lists each unique code sequence and the transmitting device 102 corresponding to the unique code sequence. That is, the code table may list multiple transmitting device 102 and the unique code sequence assigned to each transmitting device 102 and used by the data modulator 108 of each respective transmitting device 102 to module data input prior to transmission. Accordingly, the data modulator 108 of each transmitting device 102 uses a different unique code sequence to module data input.

The data correlator 110 calculates a set of correlation values for a received sequenced data input by cross correlating the sequenced data input with each of the code sequences listed in the code table. The data correlator 110 compares each correlation value from the set of correlation values with a threshold correlation value. The correlation value calculated by cross correlating the sequenced data input with the code sequence that was used to generate the sequenced data input will meet or exceed the threshold correlation value. Alternatively, the correlation values calculated by cross correlating the sequenced data input with the code sequences that were not used to generate the sequenced data input will be less that the threshold correlation value (e.g., will not meet or exceed the threshold value). Once the data correlator 110 identifies the correct code sequence (e.g., identifies the code sequence used to calculate a correlation value that meets or exceeds the threshold correlation value), the data correlator 110 uses the code table to identify the transmitting device 102 that corresponds to the code sequence (e.g., the transmitting device 102 that is assigned the code sequence to generate sequenced data input). The transmitting device 102 corresponding to the code sequence is the transmitting device 102 that transmitted the sequenced data input.

A data input is an ordered set of individual values, such as a binary number made up of an ordered set of zeroes and ones (e.g., 0001, 0010, etc.). The data modulator 108 of the transmitting device 102 uses the unique code sequence (e.g., gold code) assigned to the transmitting device 102 to modulate the data input into a sequenced data input. The resulting sequenced data input is an ordered set of individual values that includes more individual values than the original data input. For example, the original data input may include four individual values (e.g., 0001) and the sequenced data input may include sixteen individual values (e.g., 0001 0001 0001 0001).

The transmitting device 102 transmits the sequenced data input to the receiving device 104, either once or multiple times to provide redundancy for error correction. The data correlator 110 of the receiving device 102 calculate a set of correlation values for the received sequenced data input by cross correlating the sequenced data input with each code sequence included in its maintained code table. Each code sequence is an ordered set of individual values that includes the same number of individual values as the sequenced data input transmitted by the transmitting device 102. Cross correlation is an algorithm for calculating the correlation value based on a sequenced data input and a code sequence. To cross correlate a sequenced data input and a code sequence, in some embodiments, the data correlator 110 multiplies the corresponding individual values from the sequenced data input and the code sequence and determines the sum of the resulting values. For example, to determine the correlation value between the sequenced data input 1001 and the code sequence 1101, the data correlator 110 multiplies the first value from sequenced data input with the first value from code sequence (1*1=1), multiplies the second value from sequenced data input with the second value from code sequence (0*1=0), multiplies the third value from sequenced data input with the third value from code sequence (0*0=0), and multiplies the fourth value from sequenced data input with the fourth value from code sequence (1*1=1). The data correlator 110 assigns the value of negative one to each resulting 0 and then determines the sum of resulting values (e.g., 1+(−1)+(−1)+1=0).

The data correlator 110 performs this process of cross correlating the sequenced data input with each code sequence maintained in the code table, resulting in the set of correlation values for the sequenced data input. The data correlator 110 then compares each correlation value to the threshold correlation value to identify the code sequence used to generate the sequenced data input. The data correlator 110 can then identify the transmitting device 102 that transmitted the sequenced data input based on the identified code sequence. For example, the data correlator 110 uses the code table to identify the transmitting device 110 that corresponds to the code sequence determined to have been used to generate the sequenced data input.

In some cases, an error that occurs during transmission of the sequenced data input may result in one or more individual values being added to the sequenced data input. As a result, the number of individual values received by the receiving device 104 may be greater than the number of individual values transmitted by the transmitting device 102. This causes an issue because data sequences of different lengths cannot be cross correlated. Rather than requesting that the sequenced data input be retransmitted by the transmitting device 102, the data correlator 110 of the receiving device 104 punctures the sequenced data input to reduce the number of individual values included in the sequenced data input. Puncturing the sequenced data input includes removing one or more of the individual values included in the sequenced data input. For example, a sequenced data input that includes seventeen individual values may be punctured to remove one of the individual values, resulting in a sequenced encoded data input that includes sixteen individual values.

The data correlator 110 attempts to determine the transmitting device 102 that transmitted the sequenced data input based on the resulting punctured sequenced data input. For example, the data correlator 110 calculates a set of correlation values based on the punctured sequenced data input and compares the set of correlation values to the threshold correlation value. In the event that one of the correlation values meets or exceeds the threshold value, the data correlator 110 determines that the code sequence used to calculate the correlation value was used to generate the sequenced data input. The data correlator 110 then identifies the transmitting device 110 that transmitted the sequenced data input based on the identified code sequence.

In some instance, each of the correlation values calculated based on a punctured sequenced data input may be less than the threshold correlation value (e.g., none of the correlation values meets or exceeds the threshold correlation value). Accordingly, the data correlator 110 may repeat the puncturing process and generate additional punctured sequenced data inputs by removing different individual values from the sequenced data input. The data correlator 110 may calculate a set of correlation values based on each additional punctured sequenced data input and compare the correlation values to the threshold correlation value. This puncturing process may be repeated until the data correlator identifies the code sequence used to generate the sequenced data input (e.g., a correlation value exceeds the threshold correlation value) or until a threshold period of time has elapsed (e.g., a timeout occurs).

The process of puncturing the sequenced data input and attempting to identify a corresponding data output (e.g., the puncturing process) may be performed sequentially or in parallel. For example, the data correlator 110 may perform the puncturing process sequentially such that the puncturing process is repeated in response to determining that the transmitting device 102 could not be determined based on a previously punctured sequenced data input. Alternatively, the puncturing process may be performed concurrently such that the data correlator 110 generates multiple punctured sequenced data inputs from a sequenced data input and/or attempts to identify the transmitting device 102 using multiple punctured sequenced data inputs at least partially at the same time.

In some instances, the data correlator 110 may determine that the correlation values determined based on a punctured sequenced data input are not reliable for identifying the transmitting computing device 102 that transmitted the sequenced data input. For example, the data correlator may determine that more than one of the threshold values calculated based in the punctured sequenced data input meets or exceeds the threshold correlation value. As another example, the data correlator 110 may determine that, while only one correlation value exceeds the threshold correlation value, at least one other correlation value is within an unacceptable range of the threshold correlation value (e.g., at least one other correlation value exceeds a lower threshold value). In this type of instance, the data correlator 110 may ignore the results of the particular puncturing process and continue attempting to determine the identity of the transmitting device 102 using other punctured sequenced data inputs.

Figure 2:
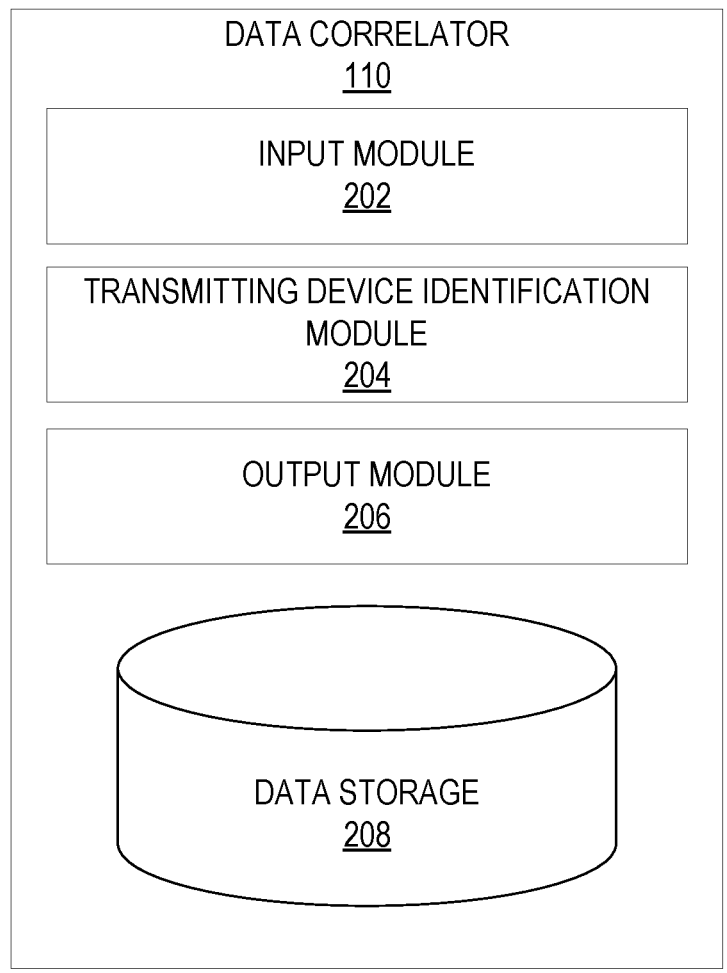
FIG. 2. is a block diagram of a data correlator, according to some example embodiments.

FIG. 2 is a block diagram of a data correlator 110, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the data correlator 110 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the data correlator 110 includes an input module 202, a transmitting device identification module 204, an output module 206, and a data storage 208.

The input module 202 receives a sequenced data input from the transmitting device 102. The sequenced data input is generated by a data modulator 108 at the transmitting device 102 prior to transmission to the receiving device 104. For example, the data modulator 108 at the transmitting device 102 uses a code sequence, such as a m-sequences or gold codes, to module a data input prior to transmission. The resulting sequenced data input is then transmitted from the transmitting device 102 to the receiving device 104. Modulating the data input prior to transmission allows the receiving device 105 to identify which transmitting device 102 transmitted the sequenced data input. For example, each transmitting device is assigned a unique code sequence (e.g., gold code, m-sequence), which the transmitting device 102 uses to modulate data input transmitted by the transmitting device 102. Modulating a data input using a code sequence allows the receiving device 104 to determine the code sequence used to modulate the data input with high probability. For example, the cross correlation of a sequenced data input with the code sequence used to generate the sequenced data input results in a relatively high correlation value. In contrast, the cross correlation of a sequenced data input with a code sequence that was not used to generate the sequenced data input results in a relatively low correlation value.

The transmitting device identification module 204 attempts to identify the transmitting device 102 that transmitted a sequenced data input received by the receiving device 104. Identifying the transmitting device 102 that transmitted a sequenced data input can be used to synchronize data transmissions received from multiple devices. This is particularly useful in embodiments in which a controller, gateway or other computing device is receiving data transmissions from multiple IoT devices.

To identify the transmitting device 102, the transmitting device identification module 204 uses a code table maintained in the data storage 208. The code table lists each unique code sequence and the transmitting device 102 corresponding to the unique code sequence.

The transmitting device identification module 204 accesses the code table from the data storage 208 and uses the code sequences listing in the code table to calculate a set of correlation values for the received sequenced data input.

For example, the transmitting device identification module 204 calculates each correlation value by cross correlating the sequenced data input with a different one of the code sequences listed in the code table. The transmitting device identification module 204 compares each correlation value from the set of correlation values with a threshold correlation value. The correlation value calculated by cross correlating the sequenced data input with the code sequence that was used to generate the sequenced data input will exceeds the threshold correlation value. Alternatively, the correlation values calculated by cross correlating the sequenced data input with the code sequences that were not used to generate the sequenced data input will be less that the threshold correlation value. Once the correct code sequence is identified (e.g., the correlation value calculated using the code sequence meets or exceeds the threshold correlation value), the transmitting device identification module 204 uses the code table to identify the transmitting device 102 that corresponds to the code sequence (e.g., the transmitting device 102 that uses the code sequence to generate sequenced data input). The transmitting device identification module 204 determines that the transmitting device 102 corresponding to the code sequence device transmitted the sequenced data input.

In some cases, an error that occurs during transmission of the sequenced data input may result in one or more individual values being added to the sequenced data input. As a result, the sequenced data input received by the receiving device 104 cannot be cross correlated with the code sequences listed in the code table. In this type of situation, the transmitting device identification module 204 punctures the sequenced data input to reduce the number of individual values included in the sequenced data input, for example, by removing one or more of the individual values included in the sequenced data input. The transmitting device identification module 204 then attempts to determine the transmitting device 102 that transmitted the sequenced data input based on the resulting punctured sequenced data input.

The transmitting device identification module 204 may repeat this puncturing process and generate additional punctured sequenced data inputs by removing different individual values from the sequenced data input. The transmitting device identification module 204 may calculate a set of correlation values based on each punctured sequenced data input and compare the correlation values to the threshold correlation value. This process may be repeated, either sequentially or concurrently, until the code sequence used to generate the sequenced data input is identified (e.g., a correlation value exceeds the threshold correlation value), a threshold period of time has elapsed (e.g., a timeout occurs), or each possible punctured data input has been generated and used to identify the transmitting computing device 102.

In some instances, more than one of the threshold values calculated based on a punctured sequenced data input may meet or exceed the threshold correlation value, or while only one correlation value exceeds the threshold correlation value, at least one other correlation value is within an unacceptable range of the threshold correlation value. In this type of instance, the transmitting device identification module 204 may ignore the results of the particular puncturing process and continue attempting to determine the identity of the transmitting device 102 using other punctured sequenced data inputs.

In the event that the transmitting device identification module 204 is able to successfully identify the transmitting device 102 that transmitted the sequenced data input, the output module 206 outputs data identifying the transmitting device 102 in a desired manner. For example, the output module 206 writes the data identifying the transmitting device 102 to the data storage 208, transmits the data identifying the transmitting device 102 to another device, performs a specified action based on the identified transmitting device 102, etc.

Figure 3:
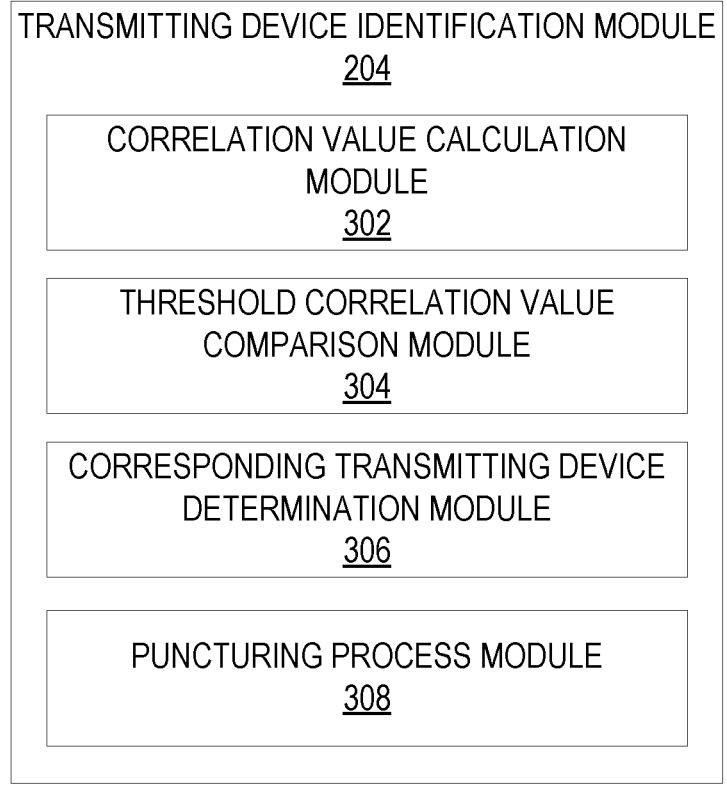
FIG. 3 is a block diagram of a transmitting device identification module, according to some example embodiments.

FIG. 3 is a block diagram of a transmitting device identification module 204, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the transmitting device identification module 204 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the transmitting device identification module 204 includes a correlation value calculation module 302, a threshold correlation value comparison module 304, a corresponding transmitting device determination module 306, and a puncturing process module 308.

The correlation value calculation module 302 calculates a set of correlation values for a sequenced data input received by the receiving device 104. Each transmitting device 102 is assigned a unique code sequence, which a data modulator of the transmitting device 102 uses to generate a sequenced data input prior to transmission to a receiving device 104. For example, the data modulator 108 uses the code sequence to modulate a data input, thereby converting the data input into a sequenced data input prior to transmission from the transmitting device 102 to the receiving device 104.

The use of code sequences to modulate a data input is beneficial because the code sequence used to modulate the data input can be determined with high probability using cross correlation. For example, the cross correlation of the sequenced data input with the code sequence used to generate the sequenced data input results in a relatively high correlation value. In contrast, the cross correlation of a sequenced data input with a code sequence that was not used to generate the sequenced data input results in a relatively low correlation value.

The receiving device 104 can therefore identify the transmitting device 102 that transmitted the sequenced data input by determining which code sequence was used to generate the sequenced data input. To accomplish this, the receiving device 104 maintains a code table that lists each unique code sequence and the transmitting device 102 corresponding to the unique code sequence. That is, the code table may list multiple transmitting device 102 and the unique code sequence assigned to each transmitting device 102 and used by the data modulator 108 of each respective transmitting device 102 to module data input prior to transmission.

The correlation value calculation module 302 calculates a set of correlation values for the received sequenced data input based on the code sequences listed in the code table. Cross correlation is an algorithm for calculating a correlation value based on a sequenced data input and a code sequence. The resulting correlation value indicates a level of similarity between the sequenced data input and the code sequence.

To cross correlate a sequenced data input and a code sequence, the correlation value calculation module 302 multiplies the corresponding individual values from the sequenced data input and the code sequence and determines the sum of the resulting values. For example, to determine the correlation value between the sequenced data input 1001 and the code sequence 1101, the correlation value calculation module 302 multiplies the first value from sequenced data input with the first value from code sequence (1*1=1), multiplies the second value from sequenced data input with the second value from code sequence (0*1=0), multiplies the third value from sequenced data input with the third value from code sequence (0*0=0), and multiplies the fourth value from sequenced data input with the fourth value from code sequence (1*1=1). The correlation value calculation module 302 assigns the value of negative one to each resulting 0 and then determines the sum of resulting values (e.g., 1+(−1)+(−1)+1=0).

The correlation value calculation module 302 performs this process of cross correlating the sequenced data input with each code sequence maintained in the code table, resulting in the set of correlation values for the sequenced data input.

The threshold correlation value comparison module 304 compares each correlation value from the set of correlation values with a threshold correlation value. The correlation value calculated by cross correlating the sequenced data input with the code sequence that was used to generate the sequenced data input will meet or exceed the threshold correlation value. Alternatively, the correlation values calculated by cross correlating the sequenced data input with the code sequences that were not used to generate the sequenced data input will be less that the threshold correlation value (e.g., will not meet or exceed the threshold value). Accordingly, the threshold correlation value comparison module 304 compares each correlation value to the threshold correlation value to identify the correlation value that meets or exceeds the threshold value.

Once the threshold correlation value comparison module 304 identifies the code sequence used to generate the sequenced data input (e.g., identifies the code sequence used to calculate a correlation value that meets or exceeds the threshold correlation value), the corresponding transmitting device determination module 306 uses the code table to identify the transmitting device 102 that corresponds to the code sequence (e.g., the transmitting device 102 that is assigned the code sequence to generate sequenced data input). The transmitting device 102 corresponding to the code sequence is the transmitting device 102 that transmitted the sequenced data input.

In some cases, an error that occurs during transmission of the sequenced data input may result in one or more individual values being added to the sequenced data input. As a result, the number of individual values received by the receiving device 104 may be greater than the number of individual values transmitted by the transmitting device 102, which causes an issue because data sequences of different lengths cannot be cross correlated.

Rather than requesting that the sequenced data input be retransmitted by the transmitting device 102, the puncturing process module 310 attempts to identify the transmitting device 102 by puncturing the sequenced data input to reduce the number of individual values included in the sequenced data input. Puncturing the sequenced data input includes removing one or more of the individual values included in the sequenced data input. For example, a sequenced data input that includes seventeen individual values may be punctured to remove one of the individual values, resulting in a sequenced encoded data input that includes sixteen individual values.

The puncturing process module 310 attempts to determine the transmitting device 102 that transmitted the sequenced data input based on the resulting punctured sequenced data input. For example, the puncturing process module 310 provides the punctured sequenced data input to the correlation value calculation module 302, which calculates a set of correlation values based on the punctured sequenced data input. The threshold correlation value comparison module 304 then compares the set of correlation values to the threshold correlation value. In the event that one of the correlation values meets or exceeds the threshold value, threshold correlation value comparison module 304 determines that the code sequence used to calculate the correlation value was used to generate the sequenced data input. The corresponding transmitting device determination module 306 then identifies the transmitting device 110 that transmitted the sequenced data input based on the identified code sequence.

In some instance, each of the correlation values calculated based on a punctured sequenced data input may be less than the threshold correlation value (e.g., none of the correlation values meets or exceeds the threshold correlation value). Accordingly, the puncturing process module 308 may repeat the puncturing process and generate additional punctured sequenced data inputs by removing different individual values from the sequenced data input. The correlation value calculation module 302 calculates a set of correlation values based on each additional punctured sequenced data input and the threshold correlation value comparison module 304 compares the correlation values to the threshold correlation value. The puncturing process module 308 repeats the puncturing process until the the code sequence used to generate the sequenced data input is identified (e.g., a correlation value exceeds the threshold correlation value) or until a threshold period of time has elapsed (e.g., a timeout occurs). The puncturing process module 308 may perform the puncturing process sequentially or in parallel.

In some instances, the puncturing process module 308 may determine that the correlation values determined based on a punctured sequenced data input are not reliable for identifying the transmitting computing device 102 that transmitted the sequenced data input. For example, the threshold correlation value comparison module 304 may determine that more than one of the threshold values calculated based in the punctured sequenced data input meets or exceeds the threshold correlation value.

As another example, the threshold correlation value comparison module 304 may determine that, while only one correlation value exceeds the threshold correlation value, at least one other correlation value is within an unacceptable range of the threshold correlation value. For example, the threshold correlation value comparison module 304 may determine whether at least two of the correlation values meets or exceeds a second lower threshold value, indicating that at least one other correlation value is within an unacceptable range of the threshold correlation value.

In either of these two situations, the puncturing process module 308 may determine that the results based on the punctured sequenced data input are unreliable. Accordingly, the puncturing process module 308 ignores the results of the particular puncturing process and continue to generate additional punctured sequenced data inputs, which can be used in attempts to identify the transmitting device 102.

Figure 4:
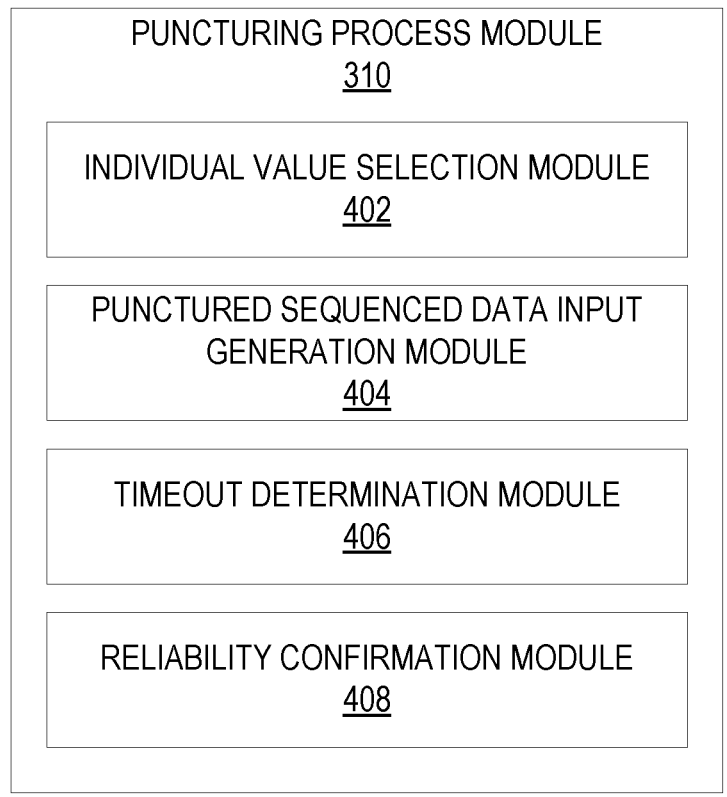
FIG. 4 is a block diagram of a puncturing process module, according to some example embodiments.

FIG. 4 is a block diagram of a puncturing process module 310, according to some example embodiments. To avoid obscuring the inventive subject matter with unnecessary detail, various functional components (e.g., modules) that are not germane to conveying an understanding of the inventive subject matter have been omitted from FIG. 4. However, a skilled artisan will readily recognize that various additional functional components may be supported by the puncturing process module 310 to facilitate additional functionality that is not specifically described herein. Furthermore, the various functional modules depicted in FIG. 4 may reside on a single computing device or may be distributed across several computing devices in various arrangements such as those used in cloud-based architectures.

As shown, the puncturing process module 310 includes an individual value selection module 402, a punctured sequence data input generation module 404, a timeout determination module 406 and a reliability confirmation module 408.

The individual value selection module 402 selects individual values to remove from a sequenced data input to generate a punctured sequenced data input. The individual value selection module 402 may select the individual values at random or using a predetermined selection order. The number of individual values selected by the individual value selection module 402 is based on the number of individual values in the code sequences included in the code table. For example, the individual value selection module 402 may select a number of individual values to remove from the sequenced data input such that the resulting punctured sequenced data input includes the same number of individual values as the code sequences.

In some embodiments, the individual value selection module 402 maintains a log of the individual values selected for a given sequence data input. The individual value selection module 402 uses the log to ensure that the same individual value or set of individual values is not selected more than once for a given sequenced data input.

The punctured sequence data input generation module 404 generates a punctured sequenced data input based on the individual values selected by the individual value selection module 402. For example, the punctured sequenced data input generation module 304 generates a punctured sequences data input that does not include the individual values selected by the individual value selection module 402. The resulting punctured sequenced data input therefore includes a subset of the individual values included in the sequenced data input.

The timeout determination module 406 determines whether a timeout has occurred, after which the puncturing process should be ceased for a given sequenced data input. For example, the timeout determination module 406 determines whether a threshold period of time has elapsed from the time the sequenced data input was received during which the transmitting device 102 that transmitted the sequenced data input was not successfully identified. In the event that the threshold period of time has elapsed, the timeout determination module 406 determines that a timeout has occurred and causes the data correlator 110 to stop the puncturing process. The data correlation 110 may then move on to another sequenced data input.

The reliability confirmation module 408 determines whether the results determined based on a punctured sequences data input are reliable for determining the transmitting device 102. For example, the threshold correlation value comparison module 304 may determine that more than one of the threshold values calculated based in the punctured sequenced data input meets or exceeds the threshold correlation value.

As another example, the threshold correlation value comparison module 304 may determine that, while only one correlation value exceeds the threshold correlation value, at least one other correlation value is within an unacceptable range of the threshold correlation value. For example, the threshold correlation value comparison module 304 may determine whether at least two of the correlation values meets or exceeds a second lower threshold value, indicating that at least one other correlation value is within an unacceptable range of the threshold correlation value.

In either of these two situations, the reliability confirmation module 408 may determine that the results determined based on the punctured sequenced data input are unreliable. Accordingly, the reliability confirmation module 408 instructs the puncturing process module 310 to ignore the results of the particular puncturing process and continue to generate additional punctured sequenced data inputs, which can be used in attempts to identify the transmitting device 102.

Figure 5:
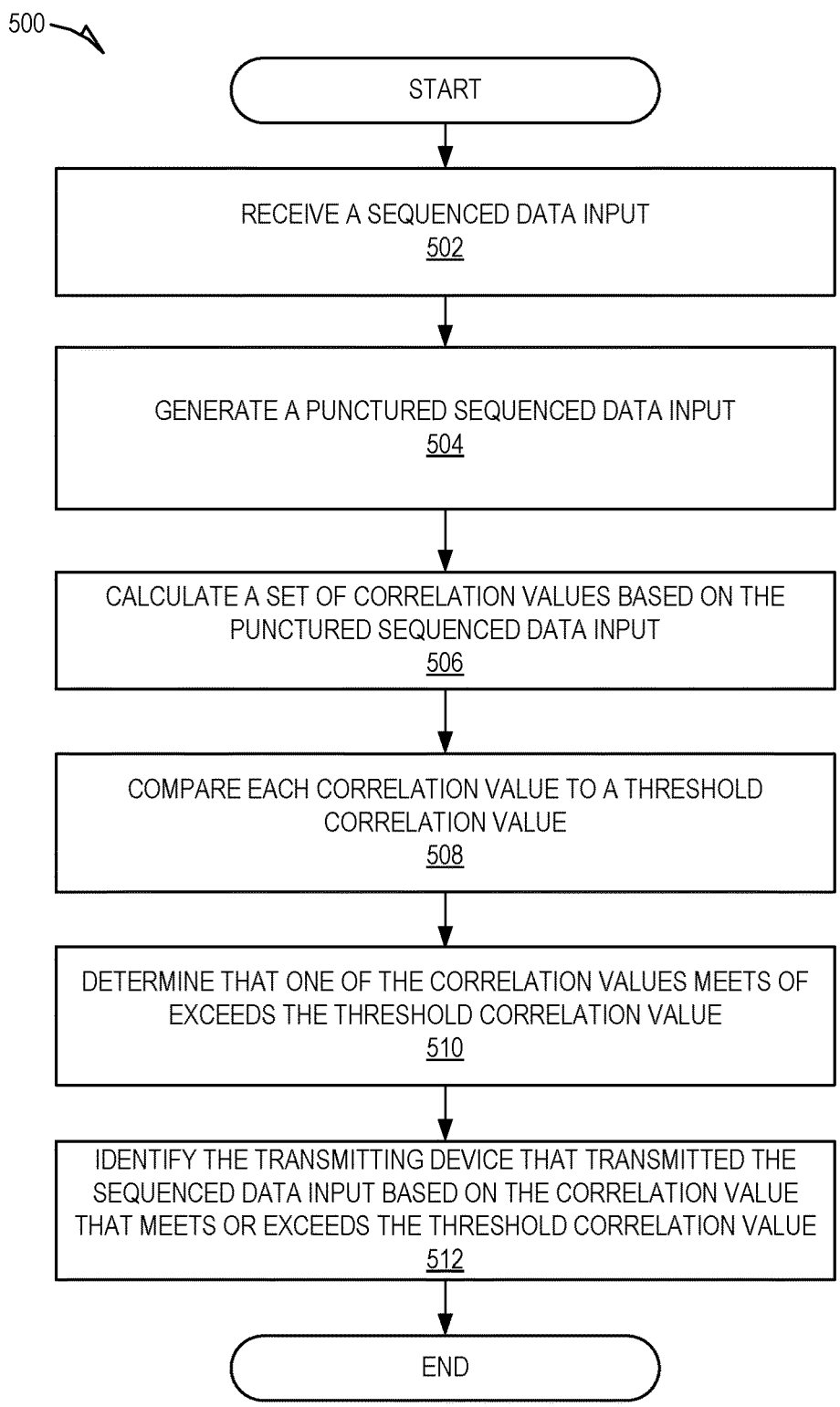
FIG. 5 is a flowchart showing an example method for improved data transmissions using puncturing and code sequences, according to certain example embodiments.

FIG. 5 is a flowchart showing another example method for improved data transmissions using puncturing and code sequences, according to certain example embodiments. The method 500 may be embodied in computer readable instructions for execution by one or more processors such that the operations of the method 500 may be performed in part or in whole by the data correlator 110; accordingly, the method 500 is described below by way of example with reference thereto. However, it shall be appreciated that at least some of the operations of the method 500 may be deployed on various other hardware configurations and the method 500 is not intended to be limited to the data correlator 110.

At operation 502, the input module 202 receives a sequenced data input. The input module 202 receives the sequenced data input from a transmitting device 102. The sequenced data input is generated by a data modulator 108 at the transmitting device 102 prior to transmission to the receiving device 104. For example, the data modulator 108 at the transmitting device 102 uses a code sequence, such as a m-sequences or gold codes, to module a data input prior to transmission. The resulting sequenced data input is then transmitted from the transmitting device 102 to the receiving device 104. Modulating the data input prior to transmission allows the receiving device 105 to identify which transmitting device 102 transmitted the sequenced data input. For example, each transmitting device is assigned a unique code sequence (e.g., gold code, m-sequence), which the transmitting device 102 uses to modulate data input transmitted by the transmitting device 102. Modulating a data input using a code sequence allows the receiving device 104 to determine the code sequence used to modulate the data input with high probability. For example, the cross correlation of a sequenced data input with the code sequence used to generate the sequenced data input results in a relatively high correlation value. In contrast, the cross correlation of a sequenced data input with a code sequence that was not used to generate the sequenced data input results in a relatively low correlation value.

At operation 504, the puncturing process module 310 generates a punctured sequenced data input. In some cases, an error that occurs during transmission of the sequenced data input may result in one or more individual values being added to the sequenced data input. As a result, the number of individual values received by the receiving device 104 may be greater than the number of individual values transmitted by the transmitting device 102, which causes an issue because data sequences of different lengths cannot be cross correlated. Rather than Rather than requesting that the sequenced data input be retransmitted by the transmitting device 102, the puncturing process module 310 attempts to identify the transmitting device 102 by puncturing the sequenced data input to reduce the number of individual values included in the sequenced data input. Puncturing the sequenced data input includes removing one or more of the individual values included in the sequenced data input.

At operation 506, the correlation value calculation module 302 calculates a set of correlation values based on the punctured sequenced data input. Each transmitting device 102 is assigned a unique code sequence, which a data modulator of the transmitting device 102 uses to generate a sequenced data input prior to transmission to a receiving device 104. For example, the data modulator 108 uses the code sequence to modulate a data input, thereby converting the data input into a sequenced data input prior to transmission from the transmitting device 102 to the receiving device 104.

The use of code sequences to modulate a data input is beneficial because the code sequence used to modulate the data input can be determined with high probability using cross correlation. For example, the cross correlation of the sequenced data input with the code sequence used to generate the sequenced data input results in a relatively high correlation value. In contrast, the cross correlation of a sequenced data input with a code sequence that was not used to generate the sequenced data input results in a relatively low correlation value.

The receiving device 104 can therefore identify the transmitting device 102 that transmitted the sequenced data input by determining which code sequence was used to generate the sequenced data input. To accomplish this, the receiving device 104 maintains a code table that lists each unique code sequence and the transmitting device 102 corresponding to the unique code sequence. That is, the code table may list multiple transmitting device 102 and the unique code sequence assigned to each transmitting device 102 and used by the data modulator 108 of each respective transmitting device 102 to module data input prior to transmission.

The correlation value calculation module 302 calculate a set of correlation values for the received sequenced data input based on the code sequences listed in the code table. Cross correlation is an algorithm for calculating a correlation value based on a sequenced data input and a code sequence. The resulting correlation value indicates a level of similarity between the sequenced data input and the code sequence.

To cross correlate a sequenced data input and a code sequence, the correlation value calculation module 302 multiplies the corresponding individual values from the sequenced data input and the code sequence and determines the sum of the resulting values. For example, to determine the correlation value between the sequenced data input 1001 and the code sequence 1101, the correlation value calculation module 302 multiplies the first value from sequenced data input with the first value from code sequence ($1*1=1$), multiplies the second value from sequenced data input with the second value from code sequence ($0*1=0$), multiplies the third value from sequenced data input with the third value from code sequence ($0*0=0$), and multiplies the fourth value from sequenced data input with the fourth value from code sequence ($1*1=1$). The correlation value calculation module 302 assigns the value of negative one to each resulting 0 and then determines the sum of resulting values (e.g., 1+(−1)+(−1)+1=0).

The correlation value calculation module 302 performs this process of cross correlating the sequenced data input with each code sequence maintained in the code table, resulting in the set of correlation values for the sequenced data input.

At operation 508, the threshold correlation value comparison module 304 compares each correlation value to a threshold correlation value. The correlation value calculated by cross correlating the sequenced data input with the code sequence that was used to generate the sequenced data input will meet or exceed the threshold correlation value. Alternatively, the correlation values calculated by cross correlating the sequenced data input with the code sequences that were not used to generate the sequenced data input will be less that the threshold correlation value (e.g., will not meet or exceed the threshold value). Accordingly, the threshold correlation value comparison module 304 compares each correlation value to the threshold correlation value to identify the correlation value that meets or exceeds the threshold value.

At operation 510, the threshold correlation value comparison module 304 determines that one of the correlation values meets or exceed the threshold correlation value.

At operation 512, the corresponding transmitting device determination module 306 identifies the transmitting device that transmitted the sequenced data input based on the correlation value that meets or exceeds the threshold correlation value. Once the threshold correlation value comparison module 304 identifies the code sequence used to generate the sequenced data input (e.g., identifies the code sequence used to calculate the correlation value that meets or exceeds the threshold correlation value), the corresponding transmitting device determination module 306 uses the code table to identify the transmitting device 102 that corresponds to the code sequence (e.g., the transmitting device 102 that is assigned the code sequence to generate sequenced data input). The transmitting device 102 corresponding to the code sequence is identified as the transmitting device 102 that transmitted the sequenced data input.

Software Architecture

Figure 6:
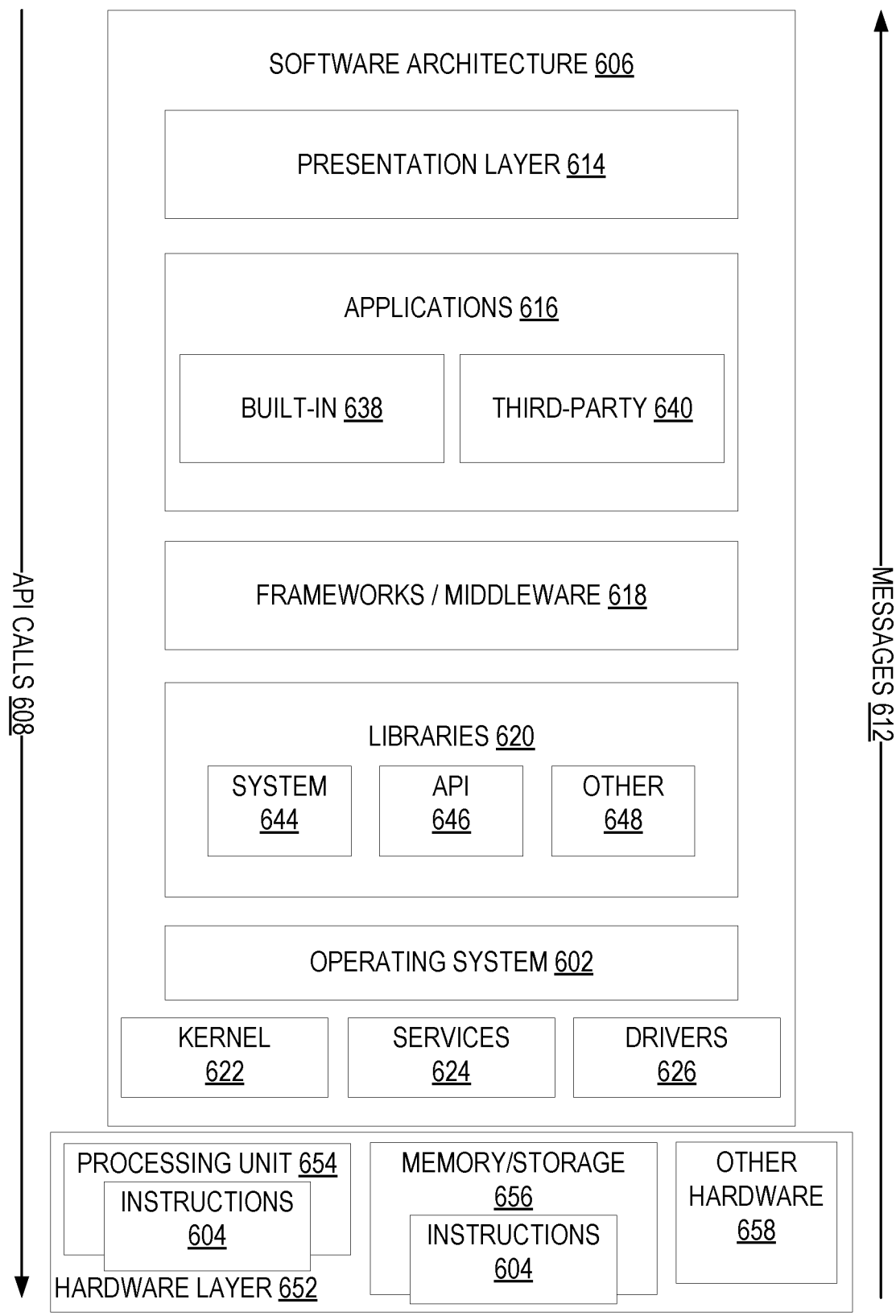
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 700 of FIG. 7 that includes, among other things, processors 704, memory 714, and (input/output) I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke application programming interface (API) calls 608 through the software stack and receive a response such as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphical user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
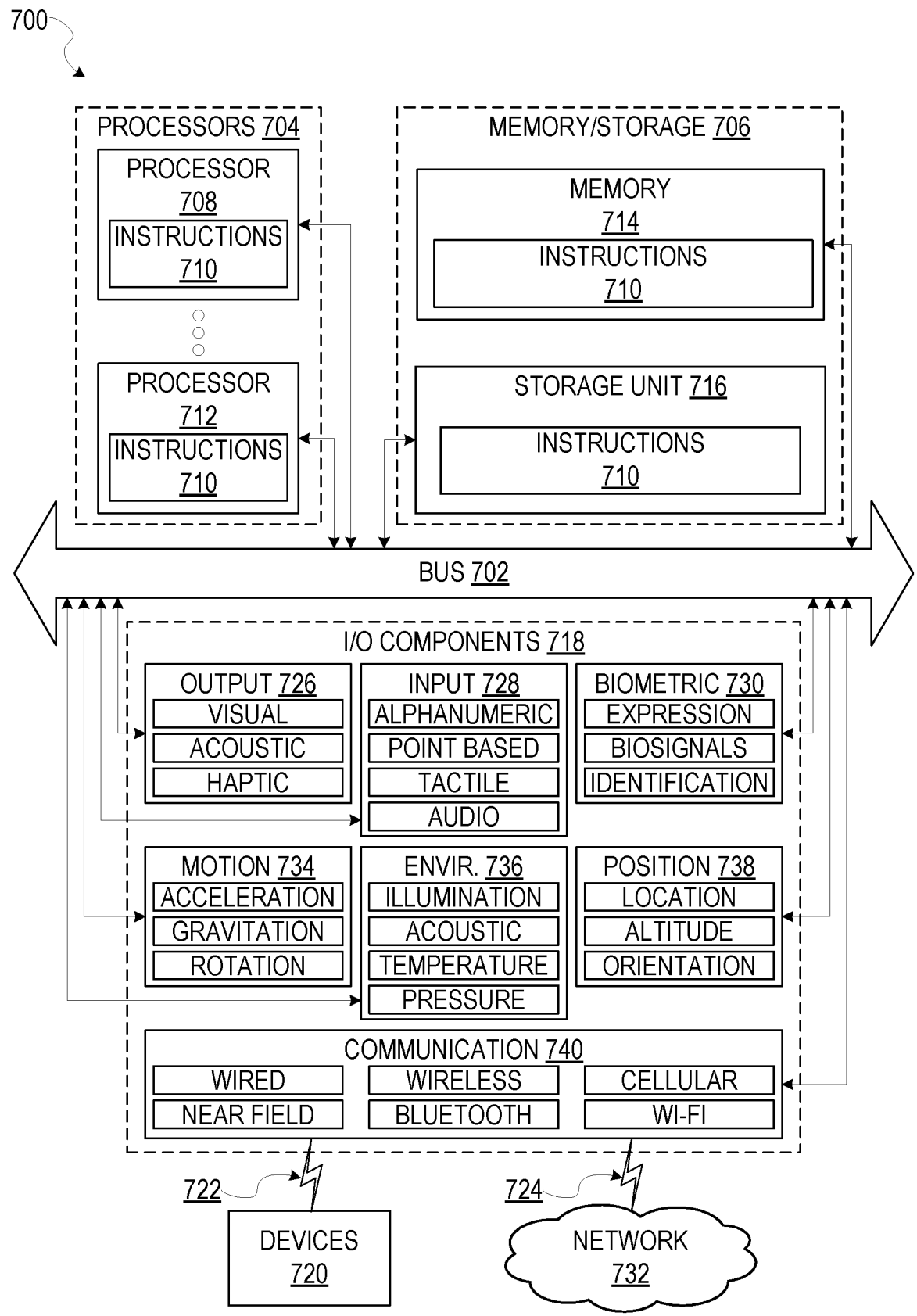
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 604 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 710 for execution by the machine 700, and includes digital or analog communications signals or other intangible medium to facilitate communication of such instructions 710. Instructions 710 may be transmitted or received over the network 732 using a transmission medium via a network interface device and using any one of a number of well-known transfer protocols.

"CLIENT DEVICE" in this context refers to any machine 700 that interfaces to a communications network 732 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 732 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 732 or a portion of a network 732 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" refers to "non-transitory" machine-readable mediums and excludes signals or other "transitory" computer readable mediums. A "non-transitory" machine-readable medium is a physical device that can store data for a period of time during which the stored data may be transferrable or reproducible. Examples of a non-transitory machine-readable medium are a physical memory device, Random Access Memory (RAM), etc. In contrast, transitory machine-readable mediums are not physical and store data only momentarily, such as a signal.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 704 or other programmable processor 704. Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an API). The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR" in this context refers to any circuit or virtual circuit (a physical circuit emulated by logic executing on an actual processor 704) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 704 may further be a multi-core processor having two or more independent processors 704 (sometimes referred to as "cores") that may execute instructions 710 contemporaneously.

What is claimed is:

1. A method performed by a receiving computing device, the method comprising:

receiving, from a transmitting computing device, a sequenced data input, the sequenced data input including a set of individual values;

in response to determining that a number of individual values from the set of individual values exceeds a threshold value, performing a first puncturing of the sequenced data input, the first puncturing yielding a first punctured data input, the first punctured data input including a first subset of the individual values from the set of individual values, wherein a number of individual values included in the first subset of the individual values does not exceed the threshold value;

for each respective predetermined data output from a set of predetermined data outputs, calculating a correlation value indicating similarity between the respective predetermined data output and the first punctured data input, yielding a first set of correlation values;

determining, based on the first set of correlation values, whether the first punctured data input correlates to any predetermined data outputs from the set of predetermined data outputs; and in response to determining that the first punctured data input correlates to a first predetermined data output from the set of predetermined data outputs, determining that the sequenced data input corresponds to the first predetermined data output.

2. The method of claim 1, wherein the sequenced data input was generated by the transmitting computing device using a binary sequence generator.

3. The method of claim 1, wherein determining whether the first punctured data input correlates to any predetermined data outputs from the set of predetermined data outputs comprises:

comparing each correlation value from the first set of correlation values to a first threshold value, yielding a comparison; and determining, based on the comparison, that a first correlation value from the first set of correlation values meets or exceeds the first threshold value, the first correlation value calculated based on the first predetermined data output from the set of predetermined data outputs.

4. The method of claim 3, wherein determining whether the first punctured data input correlates to any predetermined data outputs from the set of predetermined data outputs further comprises:

comparing each correlation value from the first set of correlation values to a second threshold value, yielding a second comparison, the second threshold value being less than the first threshold value;

determining, based on the second comparison, whether only the first correlation value from the first set of correlation values meets or exceeds the second threshold value; and in response to determining that only the first correlation value from the first set of correlation values meets or exceeds the second threshold value, determining that the first punctured data input correlates to the first predetermined data output from the set of predetermined data outputs.

5. The method of claim 4, wherein determining whether the first punctured data input correlates to any predetermined data outputs from the set of predetermined data outputs further comprises:

in response to determining that at least a second correlation value from the first set of correlation values meets or exceeds the second threshold value, determining that the first punctured data input does not correlate to any of predetermined data outputs from the set of predetermined data outputs.

6. The method of claim 1, further comprising:

performing a second puncturing of the sequenced data input, the second puncturing yielding a second punctured data input, the second punctured encoded data input including a second subset of the individual values from the set of individual values, the second subset of the individual values being different than the first subset of the individual values;

for each respective predetermined data output from the set of predetermined data outputs, calculating a correlation value indicating similarity between the respective predetermined data output and the second punctured data input, yielding a second set of correlation values; and determining, based on the second set of correlation values, whether the second punctured data input correlates to any predetermined data outputs from the set of predetermined data outputs.

7. The method of claim 6, wherein the second puncturing is performed when the first punctured data input does not correlate to any predetermined data outputs from the set of predetermined data outputs.

8. The method of claim 6, wherein the second puncturing is performed at least partially concurrently to the first puncturing.

9. The method of claim 6, wherein performing the first puncturing comprises:

removing at least a first individual value from the set of individual values included in the sequenced data input, yielding the first subset of the individual values from the set of individual values, wherein the at least the first individual value from the set of individual values is selected at random.

10. The method of claim 1, wherein the transmitting computing device is an Internet of Things (IoT) device and the set of predetermined data outputs are data for synchronizing data transmissions from the IoT device.

11. The method of claim 1, wherein the sequenced data input is a gold code sequence.

12. The method of claim 1, wherein the sequenced data input is a maximum length sequence.

13. A system comprising:

one or more computer processors; and one or more computer-readable mediums storing instructions that, when executed by the one or more computer processors, cause the system to perform operations comprising:

receiving, from a transmitting computing device, a sequenced data input, the sequenced data input including a set of individual values;

in response to determining that a number of individual values from the set of individual values exceeds a threshold value, performing a first puncturing of the sequenced data input, the first puncturing yielding a first punctured data input, the first punctured data input including a first subset of the individual values from the set of individual values, wherein a number of individual values included in the first subset of the individual values does not exceed the threshold value;

for each respective predetermined data output from a set of predetermined data outputs, calculating a correlation value indicating similarity between the respective predetermined data output and the first punctured data input, yielding a first set of correlation values;

determining, based on the first set of correlation values, whether the first punctured data input correlates to any predetermined data outputs from the set of predetermined data outputs; and in response to determining that the first punctured data input correlates to a first predetermined data output from the set of predetermined data outputs, determining that the sequenced data input corresponds to the first predetermined data output.

14. The system of claim 13, wherein the sequenced data input was generated by the transmitting computing device using a binary sequence generator.

15. The system of claim 13, wherein determining whether the first punctured data input correlates to any predetermined data outputs from the set of predetermined data outputs comprises:
  comparing each correlation value from the first set of correlation values to a first threshold value, yielding a comparison; and
  determining, based on the comparison, that a first correlation value from the first set of correlation values meets or exceeds the first threshold value, the first correlation value calculated based on the first predetermined data output from the set of predetermined data outputs.

16. The system of claim 15, wherein determining whether the first punctured data input correlates to any predetermined data outputs from the set of predetermined data outputs further comprises:
  comparing each correlation value from the first set of correlation values to a second threshold value, yielding a second comparison, the second threshold value being less than the first threshold value;
  determining, based on the second comparison, whether only the first correlation value from the first set of correlation values meets or exceeds the second threshold value; and
  in response to determining that only the first correlation value from the first set of correlation values meets or exceeds the second threshold value, determining that the first punctured data input correlates to the first predetermined data output from the set of predetermined data outputs.

17. The system of claim 16, wherein determining whether the first punctured data input correlates to any predetermined data outputs from the set of predetermined data outputs further comprises:
  in response to determining that at least a second correlation value from the first set of correlation values meets or exceeds the second threshold value, determining that the first punctured data input does not correlate to any of predetermined data outputs from the set of predetermined data outputs.

18. A non-transitory computer-readable medium storing instructions that, when executed by one or more computer processors of a receiving computing device, cause the receiving computing device to perform operations comprising:
  receiving, from a transmitting computing device, a sequenced data input, the sequenced data input including a set of individual values;
  in response to determining that a number of individual values from the set of individual values exceeds a threshold value, performing a first puncturing of the sequenced data input, the first puncturing yielding a first punctured data input, the first punctured data input including a first subset of the individual values from the set of individual values, wherein a number of individual values included in the first subset of the individual values does not exceed the threshold value;
  for each respective predetermined data output from a set of predetermined data outputs, calculating a correlation value indicating similarity between the respective predetermined data output and the first punctured data input, yielding a first set of correlation values;
  determining, based on the first set of correlation values, whether the first punctured data input correlates to any predetermined data outputs from the set of predetermined data outputs; and
  in response to determining that the first punctured data input correlates to a first predetermined data output from the set of predetermined data outputs, determining that the sequenced data input corresponds to the first predetermined data output.

19. The non-transitory computer-readable medium of claim 18, wherein the sequenced data input was generated by the transmitting computing device using a binary sequence generator.

20. The non-transitory computer-readable medium of claim 18, wherein determining whether the first punctured data input correlates to any predetermined data outputs from the set of predetermined data outputs comprises:
  comparing each correlation value from the first set of correlation values to a first threshold value, yielding a comparison; and
  determining, based on the comparison, that a first correlation value from the first set of correlation values meets or exceeds the first threshold value, the first correlation value calculated based on the first predetermined data output from the set of predetermined data outputs.

* * * * *